April 18, 1961 HENRY H. WU 2,980,837
POSITION AND STRESS CONTROLLING SERVOSYSTEM
Original Filed Dec. 12, 1955 2 Sheets-Sheet 1

INVENTOR
HENRY H. WU
BY
ATTORNEY

April 18, 1961  HENRY H. WU  2,980,837
POSITION AND STRESS CONTROLLING SERVOSYSTEM
Original Filed Dec. 12, 1955  2 Sheets-Sheet 2

INVENTOR.
Henry H. Wu

United States Patent Office 2,980,837
Patented Apr. 18, 1961

2,980,837

POSITION AND STRESS CONTROLLING SERVOSYSTEM

Henry H. Wu, Chicago, Ill., assignor to Baldwin-Lima-Hamilton Corporation, a corporation of Pennsylvania Continuation of application Ser. No. 552,464, Dec. 12, 1955. This application Apr. 28, 1959, Ser. No. 809,532

2 Claims. (Cl. 318—28)

This invention relates generally to controllers and more particularly to a controller for establishing and maintaining a selected displacement between displaceable elements solely under the control of said controller and settings thereon. This application is a continuation of Serial No. 552,464, filed December 12, 1955, now abandoned.

In a fatigue testing machine such as is shown in Patent No. 2,486,567, specimens are subjected to a static force or pre-load on which a dynamic force or vibratory load is superimposed until failure of the specimen occurs. As the test progresses, creep within the test piece or slippage of the bracket grips holding the test piece may occur. It is desirable to detect such creep or slippage and to correct for such to maintain the selected static load on the test specimen. Further, for establishing the static load at the start of the test it is desirable to have a settable dial or indicator which can be set to the desired load to be applied to the test piece which setting will result in the establishment of the selected load on the test piece.

Accordingly, objects of my invention are:

To provide a new and novel controller;

To provide a new and novel controller for the establishment of a selected condition;

To provide a new and novel controller for the maintenance of a selected condition;

To provide a new and novel controller for the establishment and maintenance of a selected condition.

Other objects and advantages will become apparent to those skilled in the art from the following description together with the accompanying drawings in which.

Figure 4:
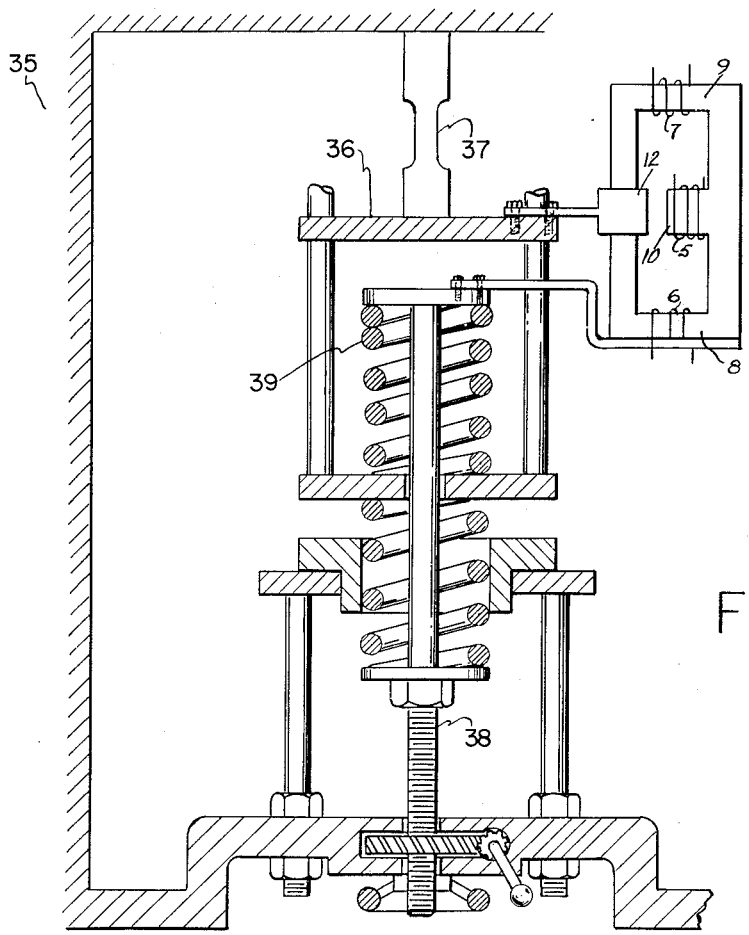

Fig. 4 diagrammatically illustrates the invention applied to a specimen in a fatigue testing machine of the type disclosed in Patent No. 2,486,567.

A fatigue testing machine is specifically referred to to illustrate a particular application of my invention. Such a testing machine may be of the general type disclosed in Patent No. 2,486,567 and comprises a frame having a stationary mechanical surface 35 and a surface element 36 parallel to and displaceable from the stationary surface. A test specimen 37 is positioned on the displaceable surface and clamped or fastened to the stationary surface by suitable brackets or fixtures. A static load is adjusted by a mechanical jack 38 and spring 39 operating on the displaceable surface element. The jack may be motor driven through suitable gearing; the load being determined by the displacement of the displaceable surface 36 relative to the stationary surface 35. The displaceable surface is then vibrated as shown in said patent to supply a vibratory or dynamic force superimposed on the static force. My invention provides a controller for facilitating the establishment of the static load and for the maintenance thereof during the progress of the test with the dynamic load superimposed on the static load applied to the specimen.

Figure 1:
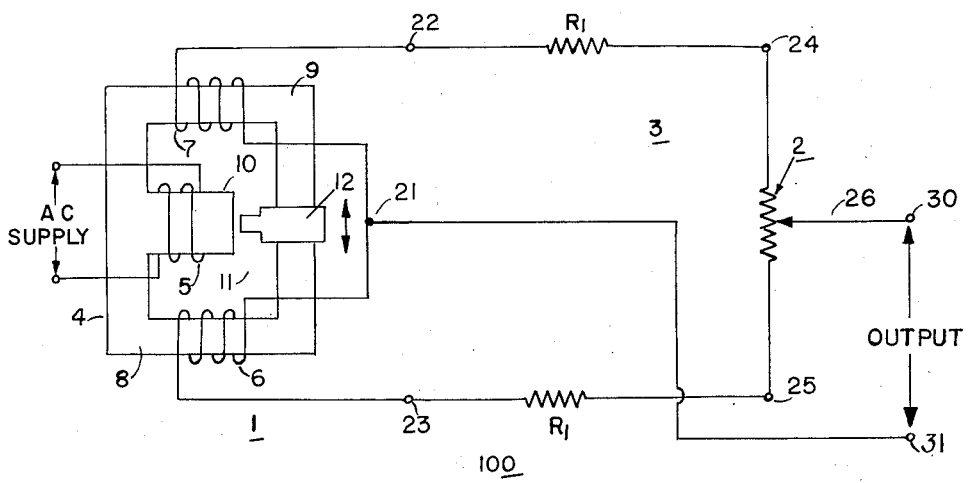
Figure 1 is a schematic illustration of my novel controller.

Referring to Figure 1 there is shown a transducer 1 which may be a differential transformer, a Metrisite, or other similar device. As shown, transducer 1 comprises a three-legged magnetic core 4 with windings 5, 6, and 7 wound about the legs 10, 8 and 9, respectively. The central leg 10 has an air gap 11, and in air gap 11 a loop of conducting material 12 is free to move along the length of core member 4 as shown by the arrow adjacent to loop 12.

If an alternating current is applied to coil 5, an alternating magnetic flux flows through the central leg 10, across air gap 11, and through each of the outside legs 8 and 9. If the conducting loop 12 is in the center of the air gap, the flux divides equally between the outside legs 8 and 9. If the conducting loop 12 is to one side of the air gap, then the flux is greater in the outside leg away from which conducting loop 12 is located. For example, if loop 12 is toward outside leg 8 then the flux in leg 9 will be greater than the flux in leg 8. This is because conducting loop 12 acts as a sort of magnetic insulator, resisting the passage of any alternating flux through itself. A voltage is induced in the coils 6 and 7 on the outside legs 8 and 9; this voltage is proportional to the flux linking these coils. If the coils 6 and 7 were connected in series, with induced voltages opposed to each other, the voltage across the two coils would be proportional to the flux difference in the two legs 8 and 9. This flux difference is in turn proportional to the displacement of the conducting loop 12, provided that the air gap flux is uniform.

In the instant invention I utilize a bridge circuit 3 to compare the voltages induced in the secondary coils 6 and 7 with the setting of a potentiometer 2 to obtain an output whenever there is a relative disagreement. To obtain the bridge circuit I connect in series: coils 6 and 7, in aiding relationship; and the full resistance of the potentiometer 2. Suitable resistors R1 are provided in the connections between terminal 22 of coil 7 and potentiometer terminal 24 and between terminal 23 of coil 6 and potentiometer terminal 25. The bridge output is taken at terminals 30 and 31 connected respectively to the common connection 21 of coils 6 and 7 and the movable contact 26 of potentiometer 2.

When the bridge circuit 3 is unbalanced an output signal across terminals 30 and 31 will be present. This signal will indicate a relative displacement of the conducting loop 12 in transducer 1 as compared to the setting of movable contact 26 of potentiometer 2 and be of a magnitude proportional to the amount of the relative displacement. When the position of conducting loop 12 in transducer 1 is proportional to the setting of movable contact 26 of potentiometer 2, the bridge circuit 3 will be in balance, and there will be no output signal across terminals 30 and 31.

By attaching the relatively movable members of transducer 1 respectively to the elements to be controlled and providing a dial and scale for the movable contact 26 of potentiometer 2 with the scale calibrated in terms of displacement, force or pressure, depending on the application, and varying the position of the elements to be controlled until no output signal is present across terminals 30 and 31 of bridge circuit 2, a means is provided to establish a displacement, force or pressure between the elements to be controlled as determined by the setting of the dial of movable contact 26 of potentiometer 2.

Figure 2:
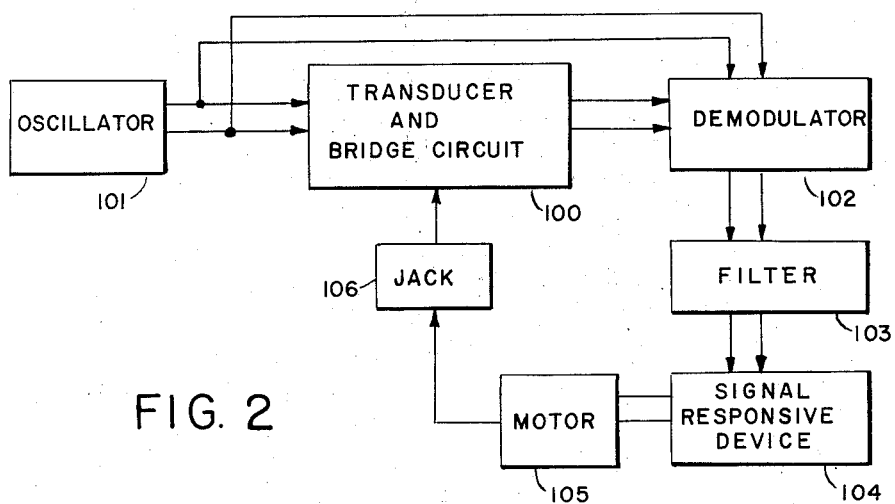
Figure 2 is a logical illustration of my novel controller in an applicable system.
Figure 3:
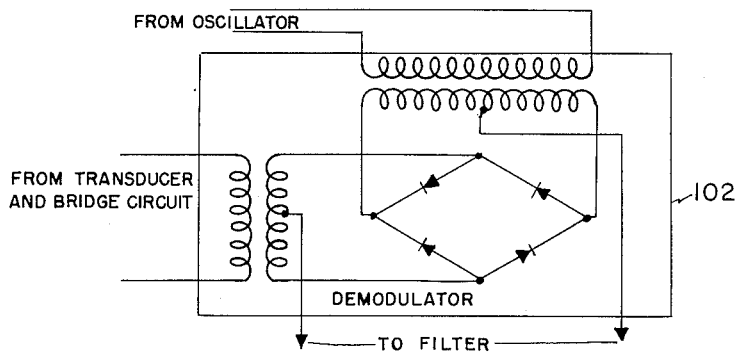
Fig. 3 is a diagrammatic illustration of a usual demodulator circuit.

Referring now to Figure 2 of the drawings a transducer and bridge circuit 100 as shown in Figure 1 is supplied by an alternating current excitation by an oscillator 101. Oscillator 101 also supplies excitation to demodulator 102 to which the output of the bridge circuit in 100 is fed. The output of demodulator 102 is fed through filter 103 to the signal responsive device 104. Oscillators, demodulators and filters are circuits well known in the art, and any of the known circuits performing the respective functions may be used for oscillator 101, demodulator 102 and filter 103. Signal responsive device 104 may be a sensitive, direct current, relay which responds to close one circuit in response to a signal of one polarity and to close another circuit in response to a signal of the opposite polarity. The two circuits operated by signal responsive device 104 are for motor 105 operating mechanical jack 106. One of the circuits causes motor 105 to rotate in one direction to operate jack 106 to lift, and the other circuit controlled by signal responsive device 104 causes motor 105 to rotate in the opposite direction to operate jack 106 to lower.

By physically connecting the core 4 of transducer 1 of Figure 1 with the stationary surface of the fatigue testing machine and physically connecting the conducting loop 12 of transducer 1 with the displaceable surface element, the transducer provides electrical signals proportional to the displacement of the machine surface elements. The potentiometer 2 used in the bridge circuit 3 is provided with a scale calibrated in force measurements. With these provisions of the transducer and bridge circuit 100 the system for controlling a fatigue testing machine will now be described.

The test specimen is placed upon the displaceable surface element and is affixed to the stationary surface element of the testing machine by suitable fixtures or clamps. The transducer is adjusted so that the loop 12 is at the electric center of the transducer. The dial of the potentiometer is set on its scale to the force which is selected for the static load. A D.C. modulated oscillator signal will appear across the output terminals 30 and 31 of the bridge circuit 3 which is demodulated in demodulator 102, passed through filter 103 and applied as a direct current to the signal responsive device 104. The signal responsive device responds by closing one of the motor circuits to cause the motor 105 to rotate and operate jack 106 to cause the displaceable surface element of the testing machine to be moved, thereby applying a force to the test specimen. This operation continues until the displaceable surface element is brought to a position such that the loop 12 is positioned in transducer 1 resulting in a bridge circuit balance. When this condition is met the oscillator signal without any modulation thereon only will appear across the output terminals 30 and 31 of the bridge circuit which is demodulated in demodulator 102. There is no signal output from demodulator 102, and no signal is applied to the signal responsive device 104 via the filter 103. The signal responsive device opens the motor circuit which it had been keeping closed, and the motor 105 stops its rotation. The jack operation is halted, and movement of the displaceable surface element is stopped. The displaceable surface element is thus brought to the desired position relative to the stationary surface element as determined by the setting of the potentiometer movable contact or dial.

The displaceable surface element is then subjected to a mechanical oscillation or vibration to apply a dynamic load superimposed on the existing static load on the test specimen. As a result the conducting loop 12 of transducer 1 will be subjected to the vibration applied to the displaceable surface element. There will then be an A.C. modulated carrier output appearing across the output terminals 30 and 31 of the bridge circuit 2, the carrier signal being supplied by the oscillator 101 and the modulation being effected by the oscillation of the conducting loop 12 of transducer 1. The signal across terminals 30 and 31 is demodulated in demodulator 102. The demodulated signal is filtered by filter 103 and, so long as conducting loop 12 oscillates symmetrically about its position in transducer 1 which resulted in bridge balance as determined by the setting of potentiometer 3, no D.C. component is present in the demodulated signal, and no output appears from filter 103. If creep in the test specimen should occur or the grips of the fixture for the test specimen should slip, the oscillation of conducting loop 12 will no longer be symmetrical about the position in transducer 1 which resulted in bridge balance, and a D.C. component will be present in the signal from demodulator 102. This D.C. signal will appear as an output from filter 103. This output will activate signal responsive device 104 to close the circuit for motor 105 which will cause the motor 105 to rotate in the direction necessary to operate jack 106 to raise or lower the average position of the displaceable surface element to effect correction of the static load and result in no D.C. component appearing in the modulated signal. By this means a variation in the static load on the test specimen, as determined by the average displacement between the stationary and displaceable surface elements is corrected, and the selected static load on the test specimen is maintained.

Having described a specific embodiment of my invention and its mode of operation, what I claim and desire to protect by Letters Patent is:

1. A circuit arrangement for establishing and maintaining a predetermined average displacement between first and second relatively displaceable surface elements where said first surface element may be vibrated normally to said second surface element, comprising a transducing means having two relatively displaceable members connected respectively to said first and second surface elements, an oscillator producing a carrier frequency to energize the transducer, a bridge in which the transducer forms one-half, means forming the other half of the bridge for preselecting the average position of the two surfaces, the signal from the bridge comprising the carrier frequency and superimposed frequency produced by the relative vibratory motion of the two transducer members, a demodulator receiving only said carrier and superimposed frequencies from the transducer, means for filtering the combined demodulated transducer signal so as to obtain a D.C. signal proportional to the average displacement of the two relatively displaceable transducer members, such D.C. signal varying in polarity and amplitude as the average varies from said predetermined value whereby no D.C. signal is present when the relatively displaceable members are at their predetermined average position, and D.C. signal responsive means responsive to an output from said filtering means for altering the average displacement between said surface elements upon occurrence of a variation thereof from the desired predetermined value thereby to reestablish the same.

2. A circuit arrangement for establishing and maintaining a predetermined average displacement between first and second relatively displaceable surface elements where said first surface element may be vibrated normally to said second surface element, comprising a core structure affixed to one of said surface elements having a primary winding and two secondary windings connected in series aiding, means jointly affecting the magnetic flux paths in said core structure linking said secondary windings affixed to the other of said surface elements, a source of alternating current connected across said primary winding, a potentiometer connected to said series connected secondary windings to form a bridge network having one of said secondary windings and one arm of said potentiometer as one branch and the other of said secondary windings and the other arm of said potentiometer as the other branch, said potentiometer being settable to establish the desired average displacement, signal demodulating means for receiving only the output from said bridge network and for removing the source alternating current component therefrom, filtering means connected to the output of said demodulating means for filtering signals received thereby so as to obtain only a D.C. signal proportionate to the average variation of the relative displacement of said surface elements, and D.C. signal responsive means connected to the output of said filtering means for establishing and maintaining the predetermined average displacement between said surface elements in response to signals produced by relative vibratory movement of said surface elements.

References Cited in the file of this patent

UNITED STATES PATENTS

| | | |
|---|---|---|
| 2,476,496 | Kliever | July 19, 1949 |
| 2,486,567 | Lazan | Nov. 1, 1949 |
| 2,632,872 | Warsher | Mar. 24, 1953 |
| 2,814,768 | Kinkel | Nov. 26, 1957 |
| 2,827,604 | Cloud | Mar. 18, 1958 |
| 2,871,432 | Marzetta | Jan. 27, 1959 |
| 2,896,141 | Stoudenmire | July 21, 1959 |

OTHER REFERENCES

Servomechanism Practice, Ahrendt, W. R., McGraw-Hill, 1954, p. 76, Figs. 5–11.